(12) United States Patent
Harper et al.

(10) Patent No.: US 7,444,894 B2
(45) Date of Patent: Nov. 4, 2008

(54) LINEAR ACTUATOR WITH WEAR-RESISTANT CERAMIC BUSHING

(75) Inventors: David Howard Flores Harper, San Jose, CA (US); Luis Hector Palacios Borja, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 10/985,436

(22) Filed: Nov. 10, 2004

(65) Prior Publication Data

US 2006/0096399 A1    May 11, 2006

(51) Int. Cl.
    *F16H 27/02*    (2006.01)
(52) U.S. Cl. ............... 74/89.23; 74/89.36; 74/89.42; 74/441; 74/424.75; 384/907.1
(58) Field of Classification Search ............. 74/89.23, 74/89.36, 89.4, 89.42, 441, 89.44, 424.75, 74/424.7, 457; 384/907.1
    See application file for complete search history.

(56) References Cited

U.S. PATENT DOCUMENTS

| | | | |
|---|---|---|---|
| 5,029,029 A | 7/1991 | Hatchett et al. ............. 360/106 |
| 5,290,070 A | 3/1994 | Deits et al. .................. 384/625 |
| 5,325,732 A * | 7/1994 | Vogel ......................... 74/89.44 |
| 5,887,985 A * | 3/1999 | Loree et al. .................. 384/492 |
| 6,229,674 B1 | 5/2001 | Todd ......................... 360/261.1 |
| 6,244,122 B1 * | 6/2001 | Hsu et al. .................. 74/89.23 |
| 6,589,448 B2 * | 7/2003 | Niwa et al. .................. 252/516 |
| 6,734,582 B2 | 5/2004 | Corbett, Jr. et al. ........... 310/12 |
| 2003/0053262 A1 | 3/2003 | Clayton et al. ........... 360/266.6 |

* cited by examiner

*Primary Examiner*—David M Fenstermacher
(74) *Attorney, Agent, or Firm*—Zilka-Kotab, PC (57) ABSTRACT

An actuator including a threaded shaft and a carriage having a shaft engaging portion coupled to the threaded shaft. The carriage is moveable in a direction parallel to an axis of the threaded shaft upon a relative rotation between the threaded shaft and the shaft engaging portion. A ceramic bushing is coupled to the shaft engaging portion of the carriage, the bushing surrounding the threaded shaft. The ceramic bushing is much harder than heretofore used materials and results in greatly reduced particulate formation. The carriage or portion thereof can be formed around the bushing, e.g., by injection molding.

27 Claims, 7 Drawing Sheets

LINEAR ACTUATOR WITH WEAR-RESISTANT CERAMIC BUSHING

FIELD OF THE INVENTION

The present invention relates to actuators, and more particularly, this invention relates to a linear actuator having ceramic bushings for improved wear resistance.

BACKGROUND OF THE INVENTION

Solenoids are traditionally used to actuate mechanisms by the application of a voltage to an electromagnetic coil. Solenoids are expensive and require considerable design effort to ensure that the mechanical load requirements are consistent with the available force profile of the solenoid. This can be particularly challenging since the solenoid provides less force near the beginning of its stroke and provides exponentially more force as the stroke reaches the end of its travel. Solenoids suffer reliability problems because magnetic flux must bridge the plunger's sliding bearing and a residual magnetic force of close tolerance must prevent the plunger from magnetically sticking to the pole face. If either of these design parameters becomes too marginal, the solenoid performance is radically altered.

Linear actuators have been designed where a motor drives a threaded shaft and a corresponding threadedly coupled nut. The nut translates laterally when prevented from rotating by a guiding surface. The motor may be driven in one direction to emulate the drive stroke of a solenoid and driven in the other direction to return the nut and an attached carriage to a home position. To define the stroke of the motor driven linear actuator, axial stops have been used.

Prior actuators have used rod-shaped guides, the carriage engaging the guides to follow therealong. To ensure unrestricted movement, roller bearings typically engage the guides. The carriage can include an internal passage through which the threaded shaft passes. Bushings are typically coupled to the carriage at the ends of the internal passage to engage the threaded shaft in order to reduce wobbling.

However, a recurring problem with using bushings is that the bushings, which contact the rotating threaded shaft, tend to wear and create particles. The threads of the screw essentially act as a saw on the bushings. The resultant particles have been found to interfere with operation of the actuator. Particularly, the particles tend to gum up the actuator, causing it to lose response time and even completely stop functioning in some systems.

Another problem that has yet to be solved is how to reliably injection mold a portion or all of the carriage around a bushing. Standard materials often used in bushings cannot consistently withstand the high heat and pressures exerted on bushings during an injection molding process, and also withstand the rigors of everyday use. Particularly, traditional materials such as plastic-based or polymer-based bearing materials tend to deform in the hot injection mold. Oil impregnated bearings outgas during injection molding process due to the heat.

There is, therefore, a need for a linear actuator device that does not exhibit the wear problems inherent in the prior art.

There is also a need for a new bushing that is capable of reliably withstanding an injection molding process.

SUMMARY OF THE INVENTION

To overcome the aforementioned disadvantages, an actuator according to one embodiment includes a threaded shaft and a carriage having a shaft engaging portion coupled to the threaded shaft. The carriage is moveable in a direction parallel to an axis of the threaded shaft upon a relative rotation between the threaded shaft and the shaft engaging portion. A ceramic bushing is coupled to the shaft engaging portion of the carriage, the bushing surrounding the threaded shaft. The ceramic bushing is much harder than heretofore used materials and results in greatly reduced particulate formation.

The ceramic bushing can be made from many materials, but preferably contains about 5 to about 50% by weight of a zirconium-containing material such as a zirconia. Ideally, the ceramic bushing contains about 20 to about 30% by weight of the zirconium-containing material.

In one embodiment, the threaded shaft extends through the carriage engaging portion. The shaft engaging portion can include internal threads adapted to engage the threaded shaft.

In another embodiment, the shaft engaging portion includes a rotatable drive wheel that engages the threaded shaft. A motor can also be coupled to the threaded shaft. In a further embodiment, a gear is coupled to the threaded shaft, the gear being adapted for engaging an external drive gear.

A method for forming at least a portion of an actuator carriage around a bushing includes coupling a bushing to a holding mechanism, and closing a mold around the bushing, the mold having an inner surface having a general shape of at least a portion of an actuator carriage. Plastic is injected into the mold to form the portion of the actuator carriage. After forming the part, the bushing and the injection molded plastic are removed from the mold. The holding mechanism is removed from the bushing.

The actuators described herein are useful in many systems, and have particular applicability to actuating a tape head in a tape drive system.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The following description is of a new actuator design that uses a wear-resistant ceramic bushing. The inventive actuator provides a compact, reduced cost design that exhibits excellent reliability. To aid the reader and to place the actuator in a context, the following description shall be described in terms of an actuator for positioning a tape head with respect to a tape passing over the tape head. However, while the actuator has particular applicability to tape drives, the actuator can be implemented in any system where actuation is needed.

Figure 1:
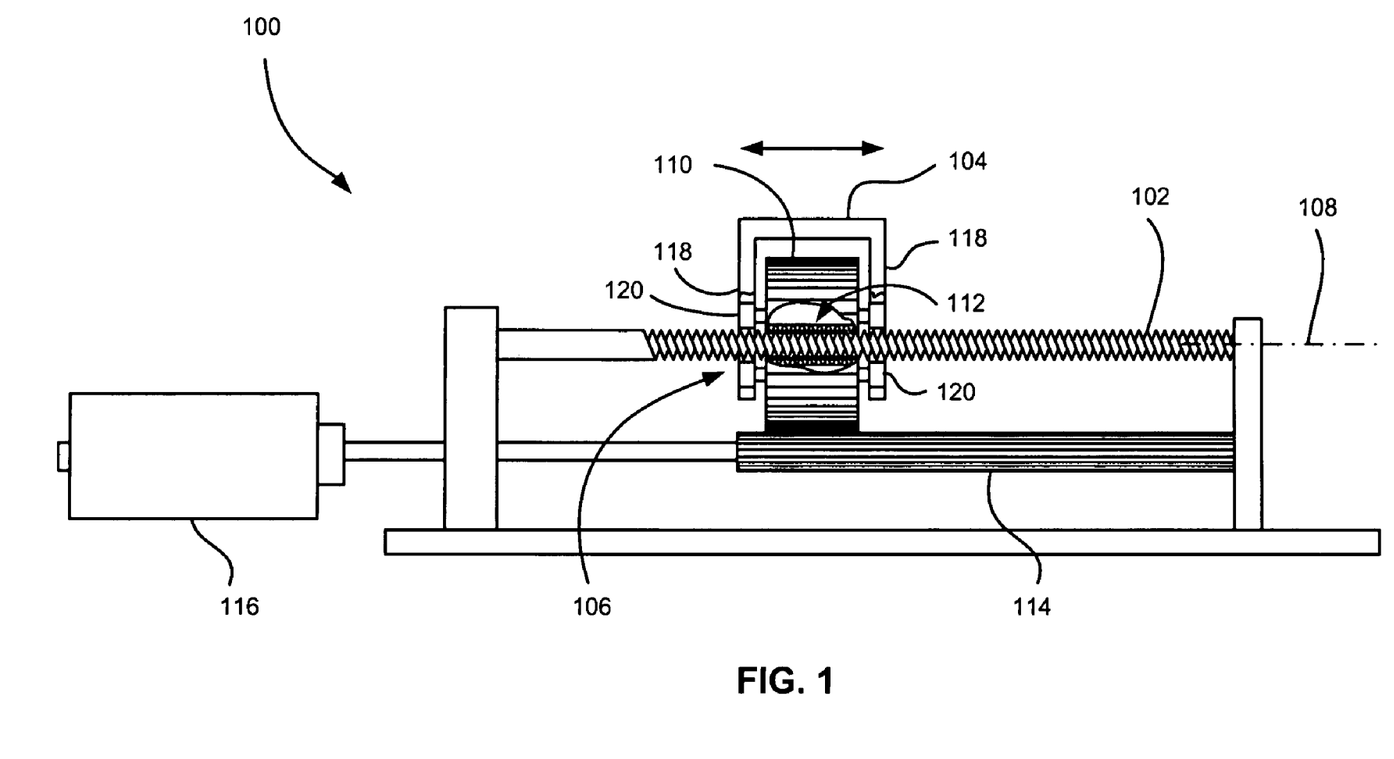
FIG. 1 is a partial cutaway side view of an actuator according to one embodiment.

FIG. 1 illustrates an actuator 100 according to one embodiment. The actuator 100 includes a threaded shaft 102 (e.g., worm screw) and a carriage 104 having a shaft engaging portion 106 coupled to the threaded shaft 102. The carriage 104 is moveable in a direction parallel to an axis 108 of the threaded shaft 102 upon a relative rotation between the threaded shaft 102 and the shaft engaging portion 106. The object to be actuated (e.g., tape head) can be coupled to the carriage 104.

In this embodiment, the shaft engaging portion 106 includes a rotatable drive wheel 110 that has internal threads 112 that engage the threaded shaft 102. The threads 112 can be integral as shown, or can be formed in a nut (not shown) coupled the drive wheel 110. The relative rotation is created when the drive wheel 110 is rotated by an external gear 114 coupled to a drive motor 116 and engaging the drive wheel 110. As the drive wheel 110 rotates about the fixed threaded shaft 102, it moves along the threaded shaft 102, pushing the rest of the carriage 104 therewith.

Figure 2:
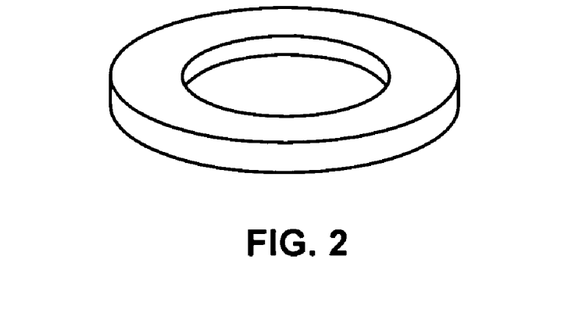
FIG. 2 is a perspective view of a ceramic bushing.

The shaft engaging portion 106 also includes a pair of arms 118 that flank the drive wheel 110. Each of the arms 118 includes an annular ceramic bushing 120 that surrounds and engages the threaded shaft 102. The inner diameter of the ceramic bushings 120 preferably have a slightly larger inner diameter than the outer diameter of the threaded shaft 102. FIG. 2 depicts an illustrative ceramic bushing 120. The ceramic bushings 120 are very hard, and so will tend not to produce particles that can adversely affect not only the functioning of the actuator 100, but also the system in which implemented. Particularly, ceramic bushings 120 have not been found to create a significant amount of filings when the threads of the threaded shaft 102 engage and scrape the bushings 120. Thus, the reliability of the overall actuator 100 is greatly improved over heretofore known actuators.

The ceramic bushing 120 preferably contains about 5 to 50% by weight, and preferably about 20 to 30% by weight, of a zirconium-containing material such as zirconia, also known as zirconium oxide and zirconium dioxide. The remainder of the raw material can be a suitable mineral or compound such as aluminum oxide (alumina), silicon nitride, silicon carbide, aluminum nitride, iron oxide, quartz, ferrites, sapphire, cordierite, mullite, steatite, glass, composites, etc. This creates a very hard substance that exhibits excellent wear resistance. Using the ratios described herein provide the desired properties with a minimal cost. Embodiments not including zirconium are also contemplated, and can be formed using any suitable ceramic raw material, including the other materials listed, alone or in combination.

To create the ceramic bushings 120, the powdered raw materials are mixed together. Water is added to the mixture to create a workably deformable clay. The clay is then formed in a mold and baked in a kiln at high temperature. Then the cured ceramic bushing 120, having the desired shape, is removed from the mold.

Alternative processes to create the bushings 120 include either mechanical or ultrasonic machining of the kilned material to form or finish the ceramic bushings 120.

In one embodiment, the shaft engaging portion 106 of the carriage 104 has been formed around the ceramic bushing 120, such as by injection molding. The ceramic bushings 120 have been found to withstand the high heat and pressures of the injection molding process.

Figure 3:
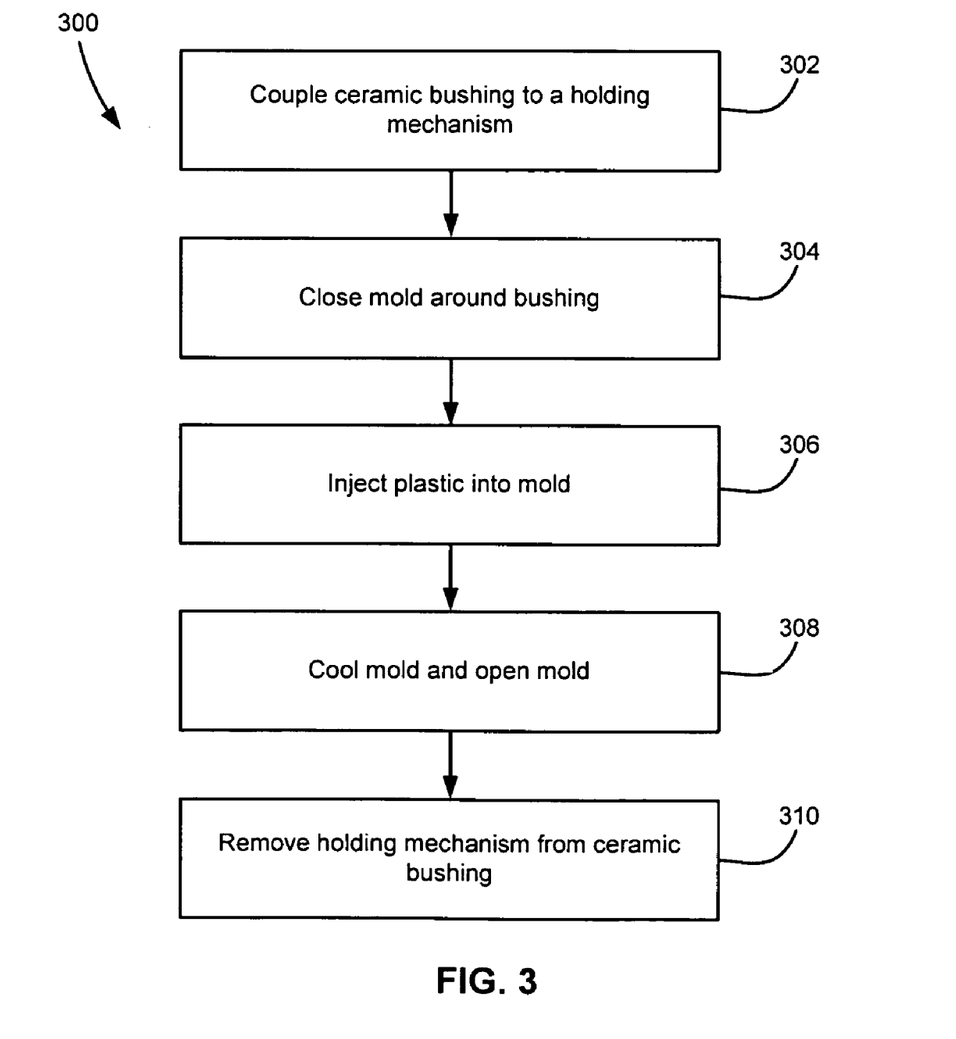
FIG. 3 is a flow diagram of a process for forming a shaft engaging portion around a ceramic bushing.

FIG. 3 depicts an illustrative process 300 for forming the shaft engaging portion (possibly including additional portions of the carriage, or the entire carriage) around the ceramic bushing. In step 302, the ceramic bushing is coupled to a pole or other suitable holding mechanism. The pole is preferably inserted through the hole of the ceramic bushing to keep the center hole open and free of the injection molded material. The pole can also define the threaded or smooth-bore through-hole for the threaded shaft in the final carriage. Note also that the bushing is preferably made of a ceramic material, but can be formed of any desired material. In step 304, a mold with an inner surface having the general shape of the shaft engaging portion is closed around the ceramic bushing. In step 306, an injection moldable plastic is injected into the mold. Suitable plastics include polypropylene, high density polyethylene, polystyrene, low density polyethylene, ABS/SAN, polyvinyl chloride, nylon, polycarbonate, thermoplastic polyester, phenolics, unsaturated polyester, urea, melamine, etc. In step 308, the mold is cooled and opened. In step 310, the pole is removed from the bushing. Any of the carriages, gears, wheels, etc. described herein can be formed by this process.

Figure 4:
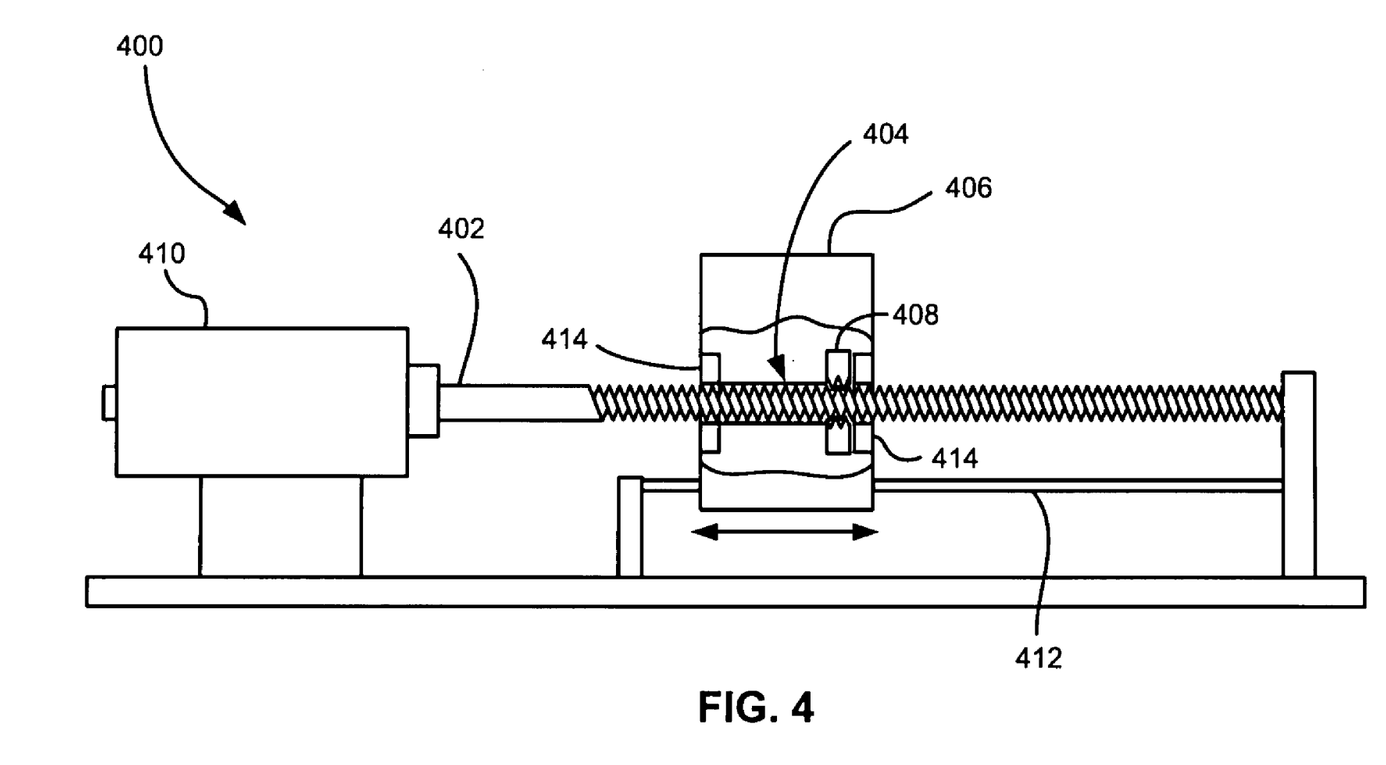
FIG. 4 is a partial cutaway side view of an actuator according to another embodiment.

FIG. 4 illustrates an actuator 400 according to another embodiment. In this embodiment, the threaded shaft 402 extends through a threaded or smooth bore aperture 404 in the carriage 406. In the smooth bore embodiment, a threaded nut 408 can be added to engage the threaded shaft 402. A motor 410 rotates the threaded shaft 402 to cause repositioning of the carriage 406. A guide 412 prevents rotation of the carriage 406 with the threaded shaft 402.

Ceramic bushings 414 surround the threaded shaft 402 at opposite ends of the carriage 406. The ceramic bushings 414 can be formed with threads therein to mesh with the threads of the threaded shaft 402. An advantage of threaded ceramic bushings 414 is that any particles created in the aperture 404 of the carriage 406 remain in situ. An additional advantage is that the threaded ceramic bushings 414 can drive a carriage 406 having a smooth bore aperture 404.

Figure 5:
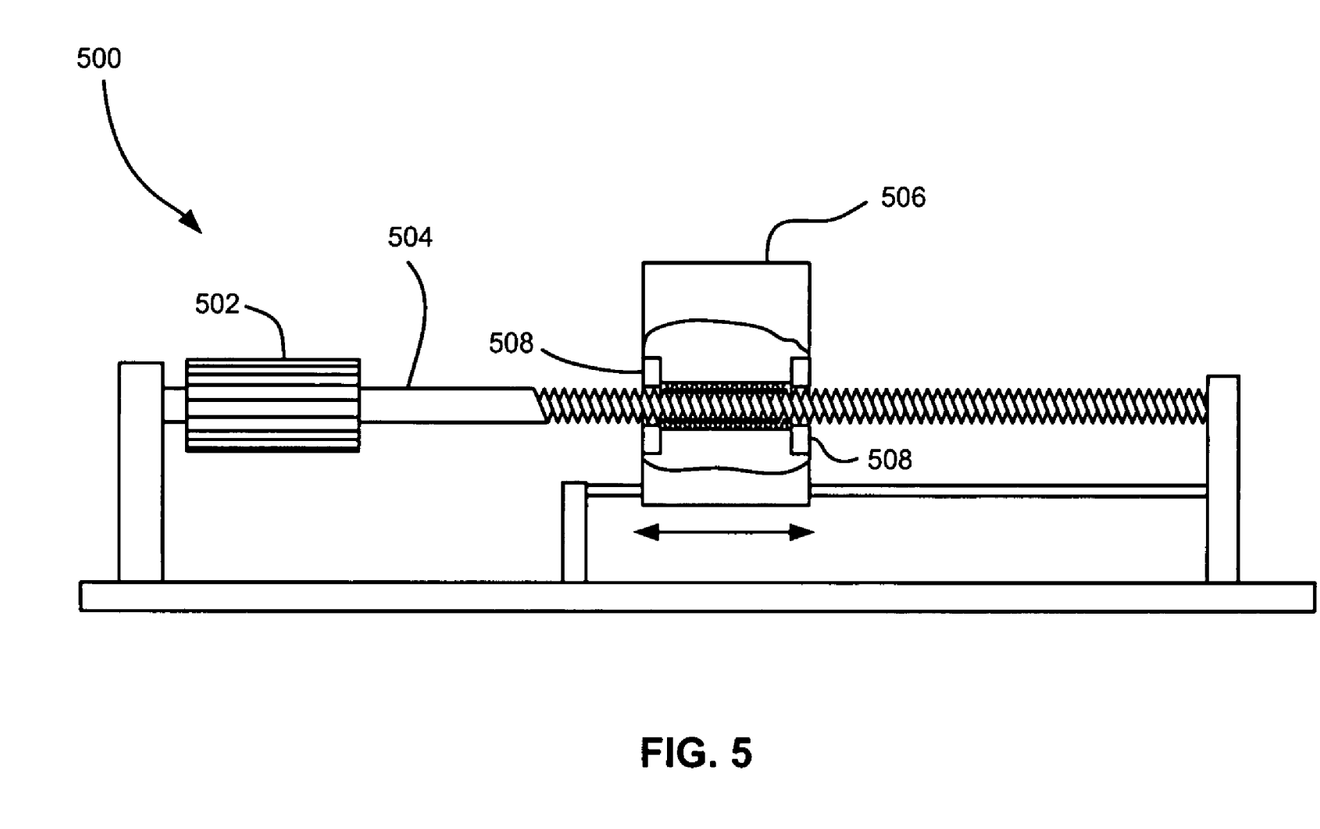
FIG. 5 is a partial cutaway side view of an actuator according to yet another embodiment.

FIG. 5 illustrates an actuator 500 according to yet another embodiment. In this embodiment, a geared wheel 502 is fixedly coupled to the threaded shaft 504. The geared wheel 502 is adapted to engage an external drive gear (not shown), as described in the embodiments referred to in FIG. 1. The carriage 506 and ceramic bushings 508 can have similar configurations as the embodiments described with respect to FIG. 4.

As mentioned above, the actuators described herein are particularly useful as coarse positioning actuators in a tape drive. Tape drives typically utilize an actuator to position the read/write head over the appropriate tracks while the tape is moving. Current read-write head positioning devices used in magnetic tape drives to align the read-write head with data in the magnetic tape often incorporate a two-actuator design. One actuator provides coarse positioning to move the read-write head between data bands. The other actuator provides fine positioning to maintain alignment between the read-write head and the data tracks. In use, the coarse positioner first moves the read/write head to the general vicinity on the tape and then the fine actuator is used for track following while the tape is in motion. The two actuators are usually mounted in a "piggyback" arrangement with the fine position actuator riding on the coarse position actuator.

The coarse positioning actuator is typically a linear stage driven by a stepper motor. Stepper motors have the ability to move the linear stage anywhere across the width of the magnetic tape at modest speeds. However, most stepper motors lack the accuracy and bandwidth necessary to maintain alignment between the read-write head and the data tracks as the magnetic tape moves across the face of the read-write head.

The fine positioning actuator is typically a voice coil motor (VCM) mounted on the linear stage and held at a rest position by some type of spring. A voice coil actuator provides micron to submicron precision positioning at a bandwidth of hundreds to thousands of hertz.

Figure 6:
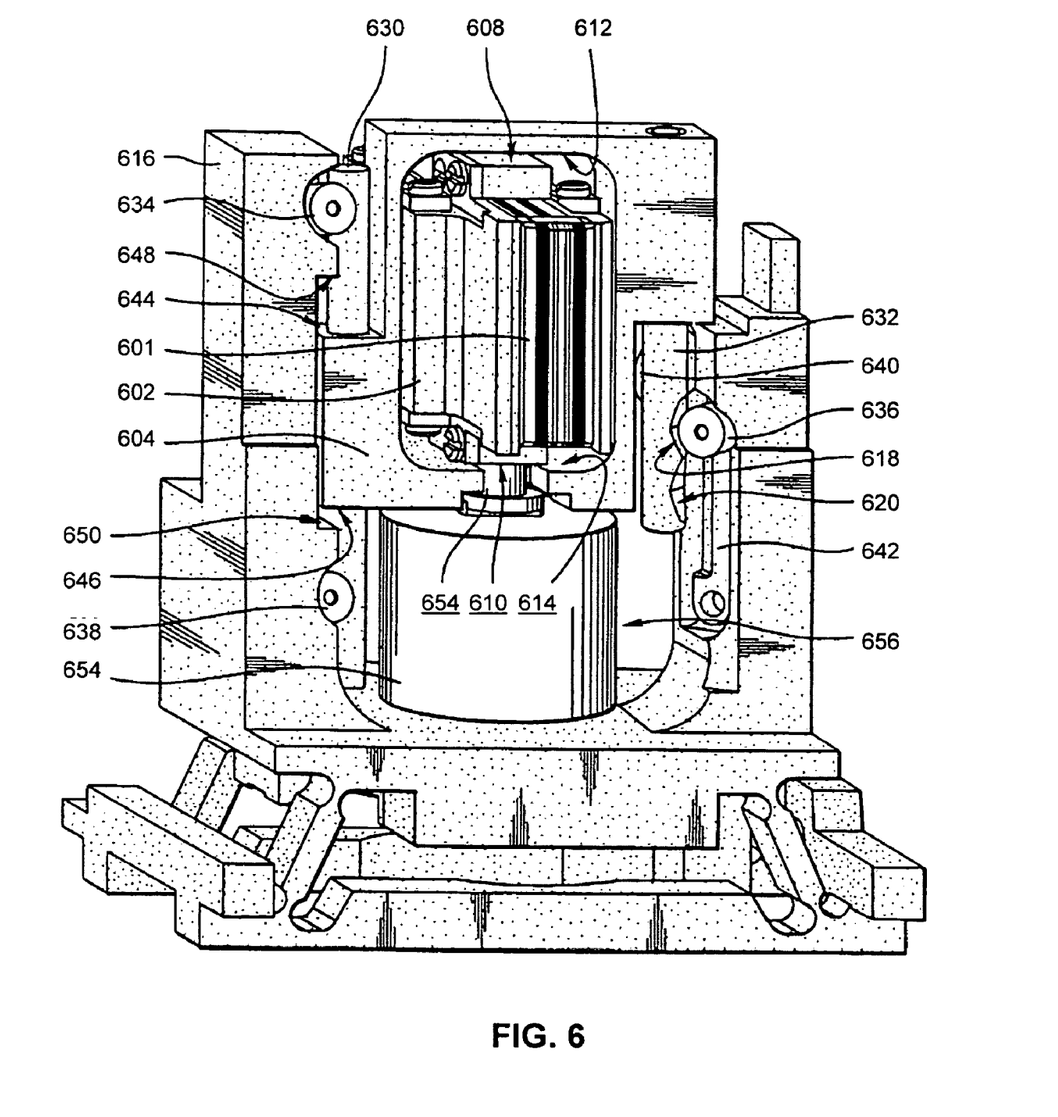
FIG. 6 is a perspective view of a coarse positioning actuator implemented in a tape drive system as seen from the tape medium side.

FIG. 6 is a perspective view of a coarse positioning actuator implemented in a tape drive system as seen from the tape medium (not shown) side. The basic mechanics of this embodiment are similar to that shown in FIG. 4. This preferred embodiment allows for transducer movement between data bands on the order of fifty to one hundred milliseconds, and a fine positioning bandwidth on the order of six hundred hertz.

Referring to FIG. 6, the transducer (tape head) 601 is mounted on the carriage 602. A resilient member (not shown) connects the carriage 602 to a moving frame 604. The resilient member can include flexures (not shown) made of thin metal strips that allow the carriage 602 to be displaced laterally (as defined by the tape medium) but not longitudinally with respect to the moving frame 604. Mechanical stops 608 and 610 are the top and bottom surfaces respectively of the carriage 602. Stop abutments 612 and 614 are inside surfaces of the moving carriage 604 opposite the mechanical stops 608 and 610 respectively.

The moving frame 604 slides relative to the fixed frame 616 on two rails 630 and 632 are guided by several guide bearings 634, 636, 638, 640. These guide bearings are rotatably mounted to the fixed frame 616. One of the bearings 636 is attached to the fixed frame 616 by a load arm 642 and acts as both a guide bearing and the click. Two detent notches 618 and 620 in rail 632 define two discrete positions for coarse positioning of the transducer 601.

Additional mechanical stops 644 and 646 and stop abutments 648 and 650 are defined on surfaces of the moving frame 604 and fixed frame 616 respectively. The mechanical stops 644-646 and the stop abutments 648-650 mechanically limit the range of motion of moving frame 604 with respect to the fixed frame 616. This keeps the rails 630 and 632 in contact with the guide bearings 634-640 and the guide/click bearing 636.

A motor 652 rotates a threaded shaft 654 of the actuator 656 that in turn causes movement of the carriage 602 in a manner similar to that described with reference to FIG. 4.

Figure 7:
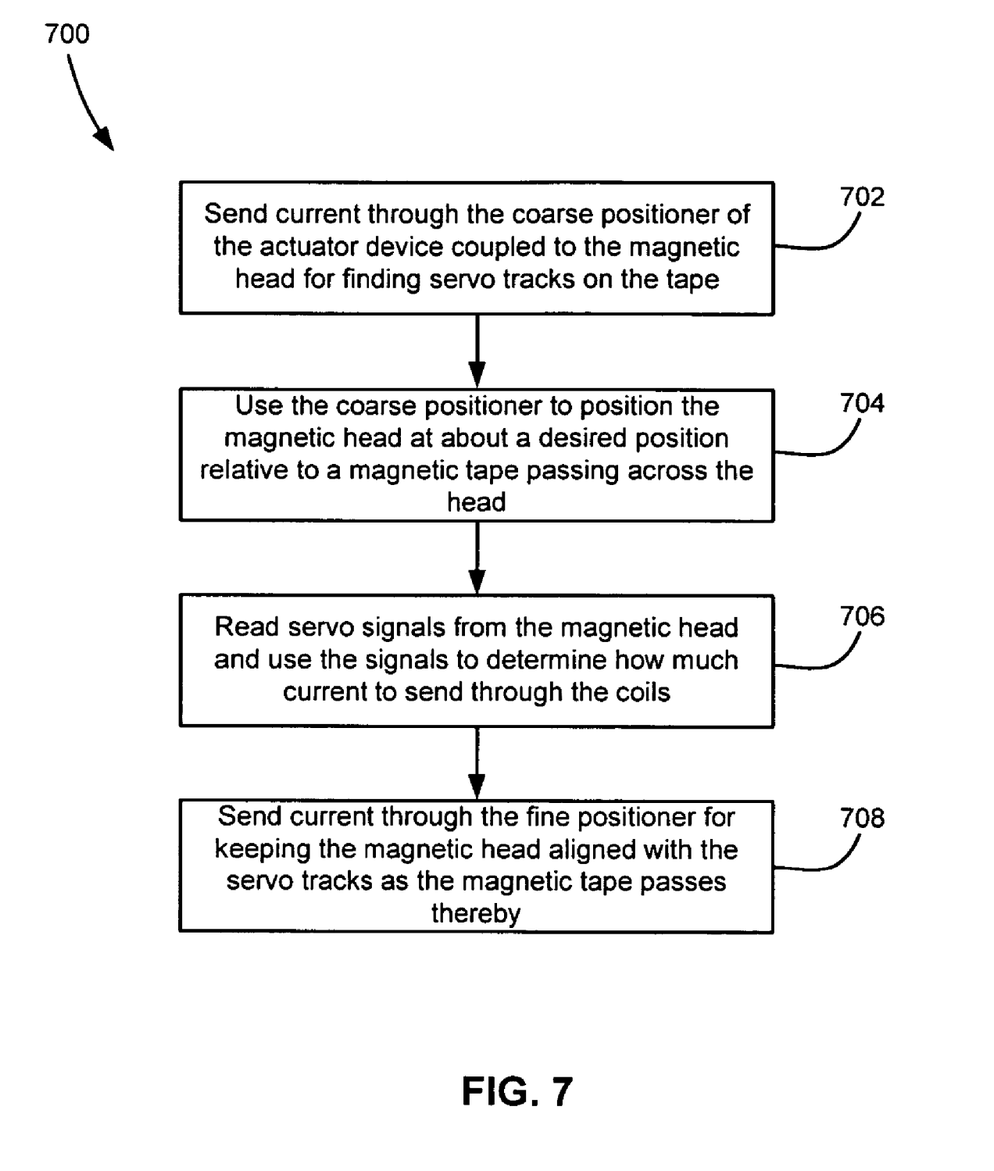
FIG. 7 illustrates a method for positioning a tape head relative to a tape.

FIG. 7 depicts a method 700 for positioning a magnetic tape head relative to a tape. In operation 702, a current is sent through a coarse positioning actuator coupled to the magnetic head for finding servo tracks on the tape. In operation 704, the coarse positioner is used to position the magnetic head at about a desired position relative to a magnetic tape passing across the head. In operation 706, servo signals are read from the magnetic head and used to determine how much current to send through the coils. In operation 708, a current is sent through the fine positioner for keeping the magnetic head aligned with the servo tracks as the magnetic tape passes thereby.

Figure 8:
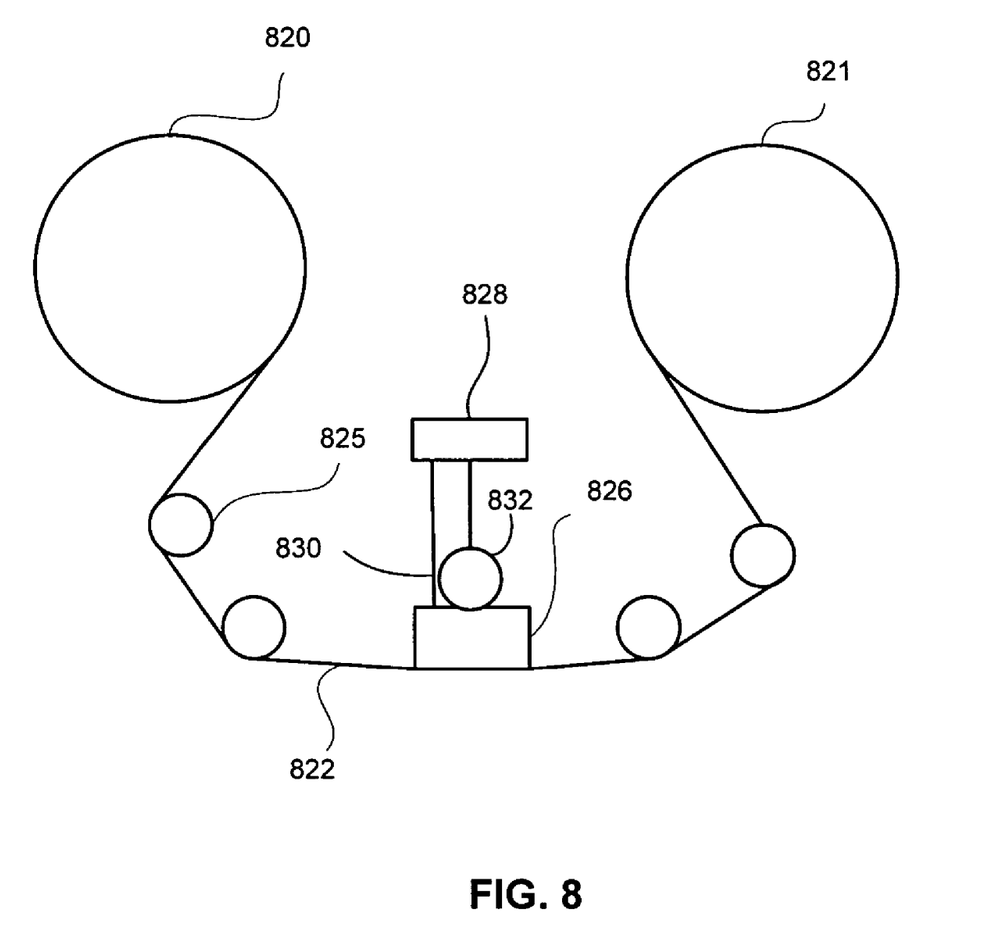
FIG. 8 illustrates a tape drive which may be employed in the context of the method of FIG. 7.

FIG. 8 illustrates a tape drive which may be employed in the context of the method 700 of FIG. 7. While one specific implementation of a tape drive is shown in FIG. 8, it should be noted that the embodiments of the previous figures may be implemented in the context of any type of drive (i.e. hard drive, tape drive, etc.)

As shown, a tape supply cartridge 820 and a take-up reel 821 are provided to support a tape 822. Moreover, guides 825 guide the tape 822 across a bidirectional tape head 826. Such bidirectional tape head 826 is in turn coupled to a controller assembly 828 via a compression-type MR connector cable 830. The actuator 832 controls position of the head 826 relative to the tape 822.

A tape drive, such as that illustrated in FIG. 8, includes drive motor(s) to drive the tape supply cartridge 820 and the take-up reel 821 to move the tape 822 linearly over the head 826. The tape drive also includes a read/write channel to transmit data to the head 826 to be recorded on the tape 822 and to receive data read by the head 826 from the tape 822. An interface is also provided for communication between the tape drive and a host to send and receive the data and for controlling the operation of the tape drive and communicating the status of the tape drive to the host, all as understood by those of skill in the art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An actuator, comprising:
   a threaded shaft;
   a carriage having a shaft engaging portion coupled to the threaded shaft, the carriage being moveable in a direction parallel to an axis of the threaded shaft upon a relative rotation between the threaded shaft and the shaft engaging portion; and
   a ceramic bushing coupled to the shaft engaging portion of the carriage, the bushing surrounding the threaded shaft.

2. An actuator as recited in claim 1, wherein the ceramic bushing contains about 5 to about 50% by weight of a zirconium-containing material.

3. An actuator as recited in claim 2, wherein the zirconium-containing material is a zirconia.

4. An actuator as recited in claim 1, wherein the ceramic bushing contains about 20 to about 30% by weight of a zirconium-containing material.

5. An actuator as recited in claim 1, wherein the threaded shaft extends through the shaft engaging portion.

6. An actuator as recited in claim 5, wherein the shaft engaging portion includes internal threads adapted to engage the threaded shaft.

7. An actuator as recited in claim 1, wherein the shaft engaging portion has been formed around the ceramic bushing.

8. An actuator as recited in claim 7, wherein the shaft engaging portion has been formed around the ceramic bushing by injection molding.

9. An actuator as recited in claim 1, further comprising a tape head coupled to the carriage.

10. An actuator as recited in claim 1, wherein the shaft engaging portion includes a rotatable drive wheel that engages the threaded shaft.

11. An actuator as recited in claim 1, further comprising a motor coupled to the threaded shaft.

12. An actuator as recited in claim 1, further comprising a gear coupled to the threaded shaft, the gear adapted for engaging an external drive gear.

13. An actuator, comprising:
a threaded shaft;
a ceramic bushing surrounding the threaded shaft; and
a carriage molded around the ceramic bushing, the carriage being moveable in a direction parallel to an axis of the threaded shaft upon a relative rotation between the threaded shaft and the carriage.

14. An actuator as recited in claim 13, wherein the ceramic bushing contains about 5 to about 50% by weight of a zirconium-containing material.

15. An actuator as recited in claim 14, wherein the zirconium-containing material is a zirconia.

16. An actuator as recited in claim 13, wherein the ceramic bushing contains about 20 to about 30% by weight of a zirconium-containing material.

17. An actuator as recited in claim 13, wherein the carriage includes internal threads adapted to engage the threaded shaft.

18. An actuator as recited in claim 13, wherein the carriage has been formed around the ceramic bushing by injection molding.

19. An actuator as recited in claim 13, further comprising a tape head coupled to the carriage.

20. An actuator as recited in claim 13, wherein the carriage includes a rotatable drive wheel that engages the threaded shaft.

21. An actuator as recited in claim 13, further comprising a motor coupled to the threaded shaft.

22. An actuator as recited in claim 13, further comprising a gear coupled to the threaded shaft, the gear adapted for engaging an external drive gear.

23. A tape drive actuator, comprising:
a coarse positioner, comprising:
a threaded shaft;
a carriage coupled to the threaded shaft, the carriage being moveable in a direction parallel to an axis of the threaded shaft upon a relative rotation between the threaded shaft and the carriage; and
a ceramic bushing coupled to the carriage, the bushing surrounding the threaded shaft; and
a fine positioner coupled to the carriage.

24. A method for forming at least a portion of an actuator carriage around a bushing, comprising:
coupling a bushing to a holding mechanism;
closing a mold around the bushing, the mold having an inner surface having a general shape of at least a portion of an actuator carriage;
injecting plastic into the mold;
removing the bushing and the injection molded plastic from the mold;
removing the holding mechanism from the bushing.

25. A method as recited in claim 24, wherein the bushing is a ceramic bushing.

26. A method as recited in claim 25, wherein the ceramic bushing contains about 5 to about 50% by weight of a zirconium-containing material.

27. A method as recited in claim 24, wherein the actuator carriage is adapted for insertion in a tape drive.

\* \* \* \* \*